Figure 1:
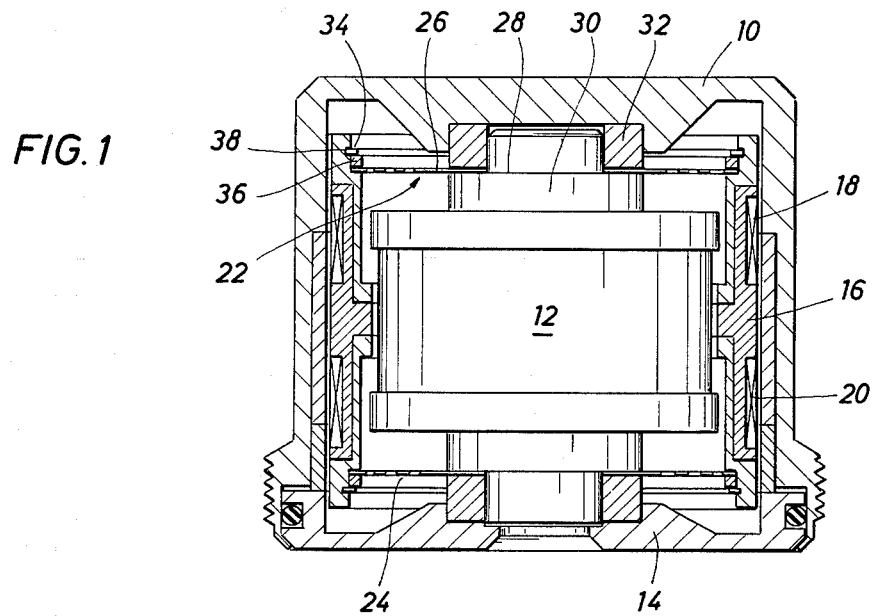

United States Patent [19]

Haggard et al.

[11] 4,238,845
[45] Dec. 9, 1980

[54] GEOPHONE SPRINGS

[75] Inventors: Samuel E. Haggard; Travis E. Riley, both of Houston, Tex.; Eugene F. Florian, deceased, late of Leona, Tex., by Dorothy Sue Florian, executrix

[73] Assignee: Mark Products, Incorporated, Houston, Tex.

[21] Appl. No.: 28,276

[22] Filed: Apr. 10, 1979

[51] Int. Cl.² .............................................. G01V 1/16
[52] U.S. Cl. ..................................... 367/183; 267/161
[58] Field of Search ............... 267/158, 159, 160, 161, 267/163, 181, 162; 367/183

[56] References Cited

U.S. PATENT DOCUMENTS

| | | | |
|---|---|---|---|
| 2,911,183 | 11/1959 | Matthews et al. | 267/161X |
| 2,947,529 | 8/1960 | Schwartz et al. | 267/161 |
| 4,144,520 | 3/1979 | McNeel | 367/183 |

Primary Examiner—George E. A. Halvosa
Attorney, Agent, or Firm—Jennings B. Thompson; Marvin B. Eickenroht

[57] ABSTRACT

A spring for a geophone has a plurality of spring arms connecting inner and outer concentric annular portions to resiliently resist relative movement of the annular portions along the concentric axis. Two support arms are connected to each spring arm. Each support arm has one end connected to one of the annular portions and the other end connected to the spring arm at a point spaced from the point of connection of the other spring arm to increase the natural frequency of the spring in a direction lateral to the concentric axis without changing appreciably the natural frequency of the spring along the concentric axis.

2 Claims, 2 Drawing Figures

GEOPHONE SPRINGS

This invention relates to an improved spring for use with geophones.

Geophones or seismometers are motion sensing devices. They are commonly used in the geophysical industry for measuring reflected seismic energy.

One of the common constructions for geophones includes the mounting of a mass, such as an annular wound coil, usually referred to as a "coil-mass" on springs for relative movement along a selected axis relative to a permanent magnet position within relative movement along the annular coil mass. The springs used to support the coil-mass are referred to as diaghpram springs or spring spiders. They are commonly formed from a sheet of spring material, such as beryllium copper. Each spring has an inner annular portion that is attached to the permanent magnet section and an outer annular portion that is attached to the coil mass. Involute or arcuate spring arms extend between the inner and outer annular portions. It is these spring arms that resiliently support the annular coil-mass for movement relative to the magnet. The inner and outer annular portions of the spring are usually concentric and it is along this concentric axis that the desired relative movement is desired.

The reflective seismic energy, however, imposes forces on the geophone that not only displace the annular coil-mass along the selected axis relative to the permanent magnet, but also cause relative movement between the coil-mass and the magnet in a direction lateral to the selected or common concentric axis of the inner and outer annular portions of the spring. This lateral movement produces undesirable and spurious signals in the output of the geophone.

The frequency of the output signals from the geophone is a function of the resonant frequency of the spring in the direction of the relative movement between the coil mass and magnet.

Hereinafter we will talk about the desired relative movement as being along the selected axis and the undesirable relative movement as lateral movement relative movement as lateral movement relative to the selected axis or simple "lateral movement".

In the commonly used spring spiders, as described above, the natural frequency of the spring in a lateral direction is usually ten to fifteen times the natural frequency of the spring along the selected axis. Seigmologists are becoming more and more interested in reflected seismic energy having frequencies that fall within a range that is 10 to 15 times the natural frequency of the geophone along the selected axis. Therefore, it is desirable to raise the natural frequency of the springs for use in geophones due to lateral movement to twenty five times or more above the natural frequency of the springs along the selected axis without appreciably modifying the natural frequency of the spring along their normal or selected axis.

It is an object of this invention to provide such a spring for supporting the moving element of a geophone.

It is a further object of this invention to provide a spring for a geophone having a natural frequency in response to reflected seismic energy in a lateral direction that is twenty to twenty five times greater than the natural frequency of the spring along the selected or normal axis of movement produced by the reflected seismic energy.

These and other objects, advantages and features of this invention will be apparent to those skilled in the art from a consideration of this specification including the attached drawings and appended claims.

In the drawings:

FIG. 1 is a vertical cross-sectional view of a conventional geophone.

Figure 2:
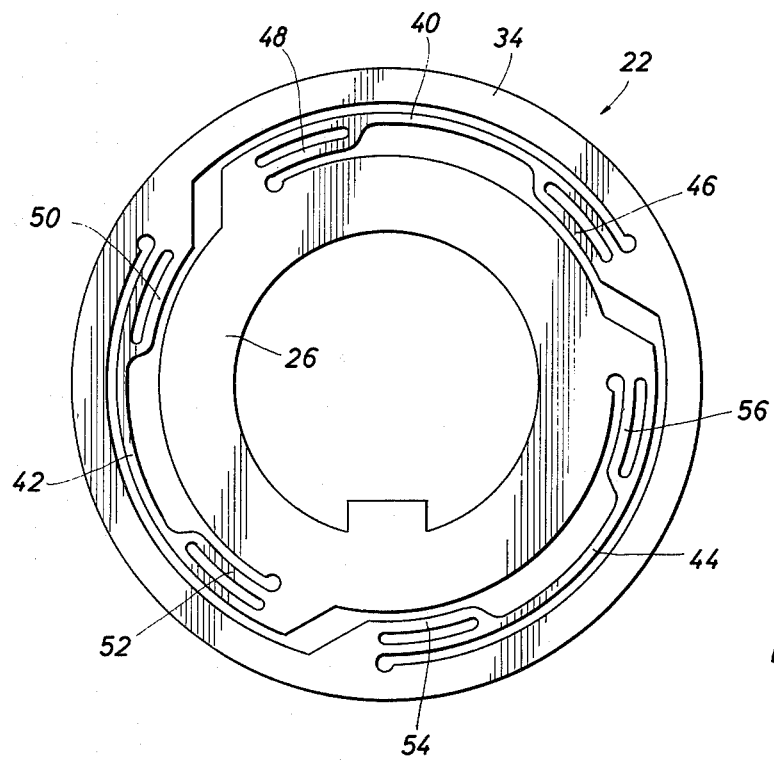

FIG. 2 is a plan view of the preferred embodiment of the improved geophone spring of geophone shown in FIG. 1 is of common construction. It includes housing 10 in which is located permanent magnet assembly 12. The permanent magnet assembly includes pole pieces etc. and it arranged to be clamped between the upper end of housing 10 and cap 14, which closes the open end of housing 10. Coil-mass 16 includes an annular assembly of members upon which coils 18 and 20 are wound.

As explained above, coil-mass 16 is annular in construction and surrounds cylindrical permanent magnet assembly 12. In the type of geophone shown the coil-mass is the intertial element. In other words, the housing and permanent magnet assembly is fixed directly to the ground and moves with the reflected seismic energy, while the coil-mass, because of its inertia, tends to resist movement causing the relative movement between the coil-mass and the permanent magnet assembly.

To allow this relative movement, coil-mass 16 is supported by two spring spiders or diaphragm springs 22 and 24. Spring 22 has an inner annular portion 26 that is positioned between upwardly facing shoulder 28 on pole piece 30 and annular spacer 32. Spring 22 also has an outer annular portion 34 that is attached to the upper end of coil-mass 16 by an upward extended shoulder on the coil-mass, spacer ring 36, and snap ring 38. Spring 24 is connected to the permanent magnet assembly and the coil-mass assembly in the same manner.

Springs 22 and 24 are identical in construction. The preferred embodiment of the spring of this invention is shown in FIG. 2, which is a plan view of spring 22. Spring 22 includes inner annular portion with the desired or selected axis of movement of the coil springs relative to the permanent magnet assembly of the geophone. Usually, spring spiders are stamped out of relatively thin sheets of spring materials, such as beryllium copper. Therefore, when initially formed, the inner and outer annular portions are co-planar as are all other elements of the spring. Prior to installation in the geophone assembly, the springs are usually pre-formed so that when the weight of the coil-mass is transferred to the springs, the outer annular portion and the spring arms will move back into a generally co-planar position, as shown in FIG. 1. Without the pre-form, the load of the coil-mass would pull the outer annular portion down below the inner annular portion and the coil would not by symetrical with the permanent magnet, when the geophone is at rest. Therefore, for this reason, the springs are generally pre-formed before installation.

At the time the spring is formed, the outer and inner annular portions are connected by spring arms that allow relative movement of the inner and outer portions along the selected axis. In the embodiment shown, three spring arms are provided, arms 40, 42, and 44. These arms are generally arcuate in shape although in some spring spiders they extend along an involute curve from the inner to the outer portions.

In accordance with this invention, a plurality of support arms are provided, each having one end attached to one of the annular portions of the spring and its other end connected to one of the spring arms intermediate its ends to increase the natural frequency of the spring in a lateral direction to the selected axis and to reduce the magnetude of the signals produced by the relative movement of the elements laterally of the selected axis. In the embodiment shown, two support arms are provided for each spring arm. For example, spring arm 40 has support arm 46 that has one end attached to the outer annular portion and the other end attached to the spring arm and support arm 48 that has one end attached to spring arm 40. The support arms are attached to the spring arm at spaced points to provide space between the points of attachment of the support arms to the spring arm. In the same manner, spring arm 42 has support arms 50 and 52 and spring arm 44 is connected to support arms 54 and 56.

The natural frequency of the spring spider along the selected axis increases with the cube of the thickness of the spring arms. Conversely, the natural frequency of the spring in a lateral direction increases with the cube of the width of the spring arms. With the arrangement shown in FIG. 2, the width of the spring arms have been increased substantially, whereas the thickness of the spring arms have not been changed. The slight increase in the effective width, will affect the natural frequency along the selected axis to some extent but not a substantial amount.

As a result of this arrangement, the natural frequency in a lateral direction for a spring of this design has been increased substantially whereas the natural frequency of the spring along the selected or desired axis of movement has been affected very little. For example in one commercial embodiment, a geophone using spring spiders of the construction shown in FIG. 2, has a resonant frequency in the lateral direction that is in excess of twenty five times the natural or resonant frequency of the geophone along the selected axis.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described what is claimed is:

1. A diaphragm spring for a geophone made from a relatively thin sheet of spring material comprising a flat sided, relatively thin, annular inner portion and a radially spaced flat sided, relatively thin annular outer portion, that is concentric to the inner portion, a plurality of spring arms connected to and extending between the inner and outer annular portions to resisliently resist relative movement of the inner and outer portions along an axis perpendicular to the flat sides of the inner and outer portions, said spring arms being generally rectanular in cross section having relatively narrow flat sides in the plane of the sides of the annular portions, and a plurality of support arms, separate and distinct from said spring arms each being generally rectangular in cross-section having relatively narrow flat sides, in the plane of the sides of the annular portions, each support arm having one end connected to one of the inner and outer portions and its other end connected to the edge of a spring arm intermediate the ends of said spring arms to increase the ratio of the resonant frequency of the spring in a direction transverse the concentric axis of the annular portions to the resonent frequency of the spring along the concentric axis.

2. In a geophone for sensing motion along a selected axis having first and second elements that provide an output signal when moved relative to each other along said axis the improvement comprising a spring for supporting one of said elements for movement relative to the other along said axis, said spring having an outer annular portion and an inner annular portion for connecting to the first and second elements respectively, a plurality of arcuate spring arms connected to and extending between the inner annular portion and the outer annular portion and a plurality of support arms separate and distinct from said spring arms, each having one end attached to one of the annular portions and its other end connected to one of the spring arms intermediate the ends of said spring arm to increase the natural frequency of the spring in a lateral direction to the selected axis and to reduce the magnitude of the signals produced by the relative movement of the elements laterally of the selected axis.

* * * * *